United States Patent [19]

Takahashi et al.

[11] Patent Number: 4,807,145
[45] Date of Patent: Feb. 21, 1989

[54] METHOD AND APPARATUS FOR MEASURING THE SHAPE, SIZE, ETC., OF A ROTARY TOOL

[75] Inventors: Motoshi Takahashi, Sagamihara; Kazuya Henmi, Hadano; Hiroshi Chiba, Yamato; Yasunobu Maegaki, Kawasaki, all of Japan

[73] Assignee: Topre Corporation, Tokyo, Japan

[21] Appl. No.: 105,729

[22] Filed: Oct. 7, 1987

[30] Foreign Application Priority Data

Oct. 15, 1986 [JP] Japan .................................. 61-244788
Jan. 26, 1987 [JP] Japan .................................. 62-15420

[51] Int. Cl.$^4$ ........................ G05B 19/27; G06F 15/46
[52] U.S. Cl. ........................... 364/474.17; 364/167.01; 318/640; 318/569; 408/3; 408/8; 408/16
[58] Field of Search ............... 364/470, 474, 167, 559; 318/563, 568–569, 640; 408/3, 6, 7, 8, 9, 14, 16

*Primary Examiner*—Jerry Smith
*Assistant Examiner*—Paul Gordon
*Attorney, Agent, or Firm*—Oblon, Fisher, Spivak, McClelland & Maier

[57] ABSTRACT

An apparatus for measuring the shape and size of a rotary tool is provided which includes a tool rotation unit for rotating the tool around the tool axis, a tool moving mechanism for moving the tool in the axial direction, a measuring head having a line sensor, and a calculation control unit. The measuring head can be moved at a rate of a predetermined angle around a lateral shaft, located in a direction perpendicular to the axis of the tool, with one end of a measuring area of the line sensor as a center. Upon measuring the tool in terms of its shape and size, the aforementioned end of the line sensor is located in a position a given distance inside the aforementioned end of the tool, the line sensor is moved for every predetermined angle around a lateral shaft, with one end of the measuring area as a center, and measured values are fed to a computer through the line sensor, while the tool is rotated around its axis for every predetermined angle.

6 Claims, 7 Drawing Sheets

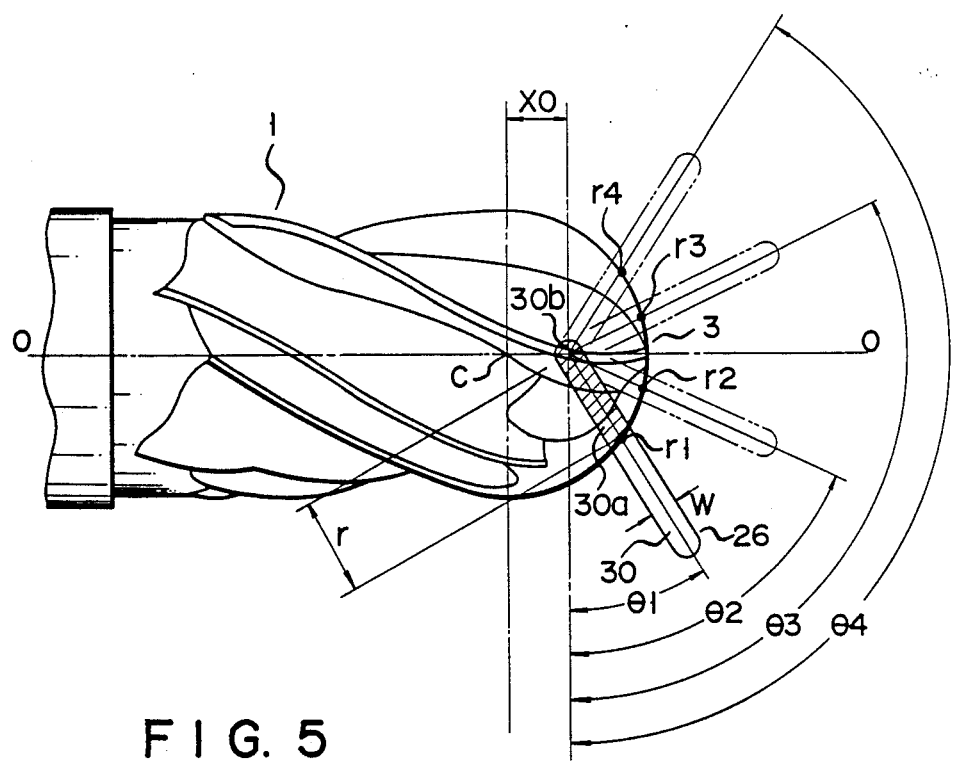
F I G. 5
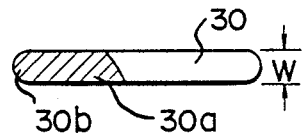
F I G. 6
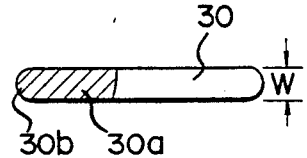
F I G. 7
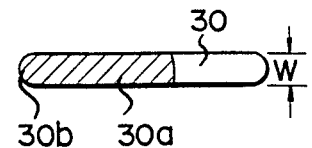
F I G. 8

METHOD AND APPARATUS FOR MEASURING THE SHAPE, SIZE, ETC., OF A ROTARY TOOL

BACKGROUND OF THE INVENTION

This invention relates to a method and apparatus for measuring the shape, size, etc., of a rotary tool, such as a ball end mill and twist drill, and in particular to a method and apparatus for measuring the shape, size, etc., of such a rotary tool with the use of a line sensor.

A ball end mill is employed as a cutting type rotary tool to machine the surface of a work in three-dimensional fashion. As shown in FIGS. 3 and 4, this type of tool 1 has a cutting edge on the outer periphery of straight section 2 and on forward end 3. In the conventional profiling operation, while the surface of a model is profiled by a stylus, the surface of a work is removed by tool 1 to have the same configuration of the model.

A cutting method has already been established which removes a work by moving a tool, under numerical control, such as on a CAD/CAM (computer-aided design/computer-aided manufacture) basis, in a three-dimensional fashion.

In order to remove the work, by a tool, with high precision, the tool per se needs to have an accurate shape and size. In tool 1, such as a ball end mill in particular, whose end is hemispherical in configuration, that hemispherical section 3 should be maintained accurate in terms of its true roundness and its radius. It is thus important to measure tool 1 accurately. It is fairly difficult to accurately measure the dimension of tool 1, since the cutting edge is present on the surface of tool 1.

In the present state, the following methods have been employed in the measurement of the tool.

(1) Method of measuring an enlargement type projector

In this method, the shadow of a tool being rotated is projected on the screen of the projector and the size of tool parts is evaluated through the plotting of the profile or contour of the shadow of the tool. This method, however, requires a longer measurement time and lots of technical skill.

(2) Method of employing veriner or micrometer calipers

This method is employed to measure the radius of straight section 2 of tool 1 with the use of the vernier or micrometer calipers and to estimate the radius R of hemispherical section 3 of tool 1 on the basis of the estimated radius. According to this method a discrepancy may be introduced between the estimated value and the actual radius R.

(3) Method of making a measurement employing a probe

A probe is in contact with the work, while the tool is being rotated, to directly measure the radius R with high measuring accuracy. This method, however, requiring lots of time as well as a high technique of experts. Furthermore, the probe wears out due to the contact of the probe with the work, exerting an adverse influence over the measured value.

SUMMARY OF THE INVENTION

It is accordingly the object of this invention to provide an apparatus and method for measuring the shape or size of a tool, which can help a user to make such measurement accurately in a short period of time by a simple operation, without requiring any special skill.

In one aspect of this invention a measuring apparatus is provided which comprises:

- a tool rotation unit including a means for chucking the tool and adapted to rotate the tool around the tool axis;
- a tool moving means for reciprocably moving the tool rotation unit in the axial direction of the tool;
- a measuring head adapted to be rotated around a lateral shaft located in a direction perpendicular to the axis of the tool and having a line sensor comprised of light projecting and receiving units which are located opposite to each other in the direction perpendicular to the axis of the tool;
- a measuring head driving means adapted to be rotated, for every predetermined direction, around the lateral shaft, with one end of the measuring head as a center; and
- a control calculation unit for controlling the tool rotation unit, the tool moving means and the measuring head driving means and for receiving measured values output from the line sensor and evaluating the measured value in accordance with an operation procedure initially programmed.

In another aspect of this invention a measuring method is provided which comprises the steps of:

moving a tool in its axial direction with one end of a measuring area of a line sensor located in a position inside the aforementioned one end of the tool;

moving the line sensor for every predetermined angle around a lateral shaft, located in a direction perpendicular to the axis of the tool, with the one end of the measuring area of the line sensor as a center;

rotating the tool by at least one turn around its axis for every aforementioned predetermined angle;

receiving measured values through the sensor each time the tool is set at the aforementioned predetermined angle; and evaluating the size of the tool by a computer on the basis of the aforementioned measured values.

According to this invention it is possible to obtain the following advantages.

(a) The measuring apparatus of this invention can perform a measurement without contacting with the tool so that it can be kept free from any action from the otherwise involved contacting pressure and elastic deformation. This assures an exact measuring operation.

(b) Since the measuring head is not set in contact with the tool, it involves no wear-out. As a result, the measuring apparatus can assure an exact measuring operation and ready maintenance.

(c) The measuring apparatus assures an exact, ready measuring operation in a short period of time.

(d) An automatic measuring operation can be performed with the aid of the computer, except for manual attachment and detachment of the tool. The evaluation as to whether or not the tool is good or bad can be performed under control of the computer.

(e) If the data of the tool measured on the measuring apparatus is registered onto the computer for machine tool control, then it can be utilized on line in the machining of the work.

(f) With the measuring apparatus incorporated into the machine tool, the extent of wear-out on the tool can be monitored even during the machining of the work, thus achieving a machining accuracy.

BRIEF DESCRIPTION OF THE INVENTION

FIG. 5 is a side view showing the movement of a line sensor in the embodiment of FIG. 1 at the time of a preparative measurement;

FIGS. 6 to 8 show the light shield patterns of the line sensor of FIG. 1;

DETAILED DESCRIPTION OF THE EMBODIMENT

Figure 1:
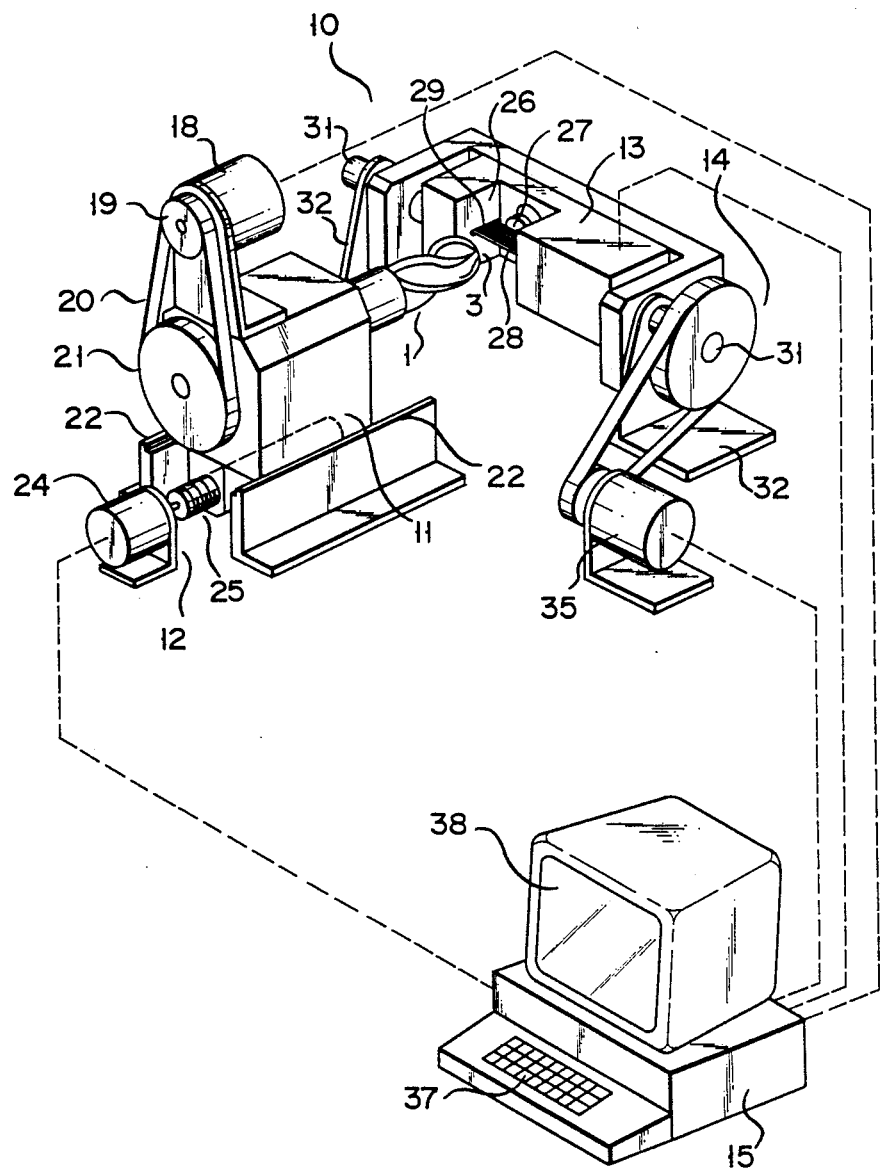
FIG. 1 is a perspective view showing a measuring apparatus according to one embodiment of this invention.

Measuring apparatus 10 according to one embodiment of this invention includes tool rotation unit 11, tool movement mechanism 12, measuring head 13, measuring head driving mechanism 14, control calculation unit 15, etc., as shown in FIG. 1.

Unit 11 includes a chuck, not shown, for clamping the tool and motor 18. The latter is a pulse motor for controlling the rotation position. Rotation body 19 is located on the driving side and rotated by motor 18 to transmit the rotational force through transmission means 20 to rotation body 21 which is located on the driven side.

Tool moving mechanism 12 is adapted to drive unit 11 in the axial direction of unit 11 with guide rail 22 movably supported on unit 11. Lead screw 25 is mounted on pulse motor 24 in tool moving mechanism 12. Upon the turning of lead screw 25, unit 11 together with tool 1 is moved along guide rail 22. Tool moving mechanism 12 is equipped with a sensor, not shown, which is adapted to electrically detect the axial position of tool 1 and to feed the result of detection back to control calculation unit 15.

Figure 12:
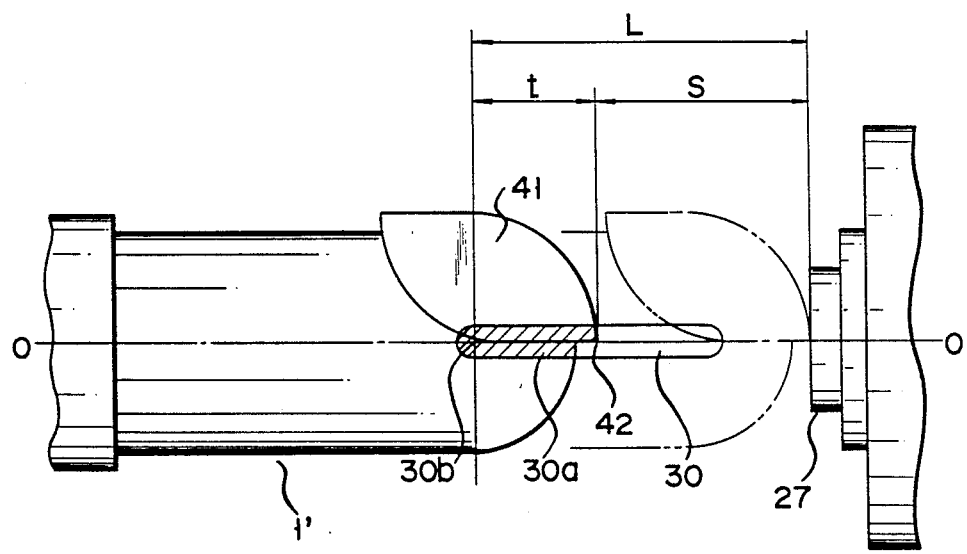
FIG. 12 is a side view showing the tool of FIG. 11 with a portion of the measuring apparatus of FIG. 1.

Measuring head 13 includes line sensor 26 and touch sensor 27, the latter being adapted to send a signal at the moment it is touched by the forward end of tool 1 shown in FIG. 12. Sensor 27 may be a touch-sensitive type switch or a proximity switch.

Line sensor 26 has light projecting unit 28 and light receiving unit 29 with the former located opposite to the latter in a direction perpendicular to the axial direction of tool 1. Line sensor 26 detects a length r of light shield portion 30a (cross-hatched portion in FIG. 5) of its measuring area 30.

Figure 2:
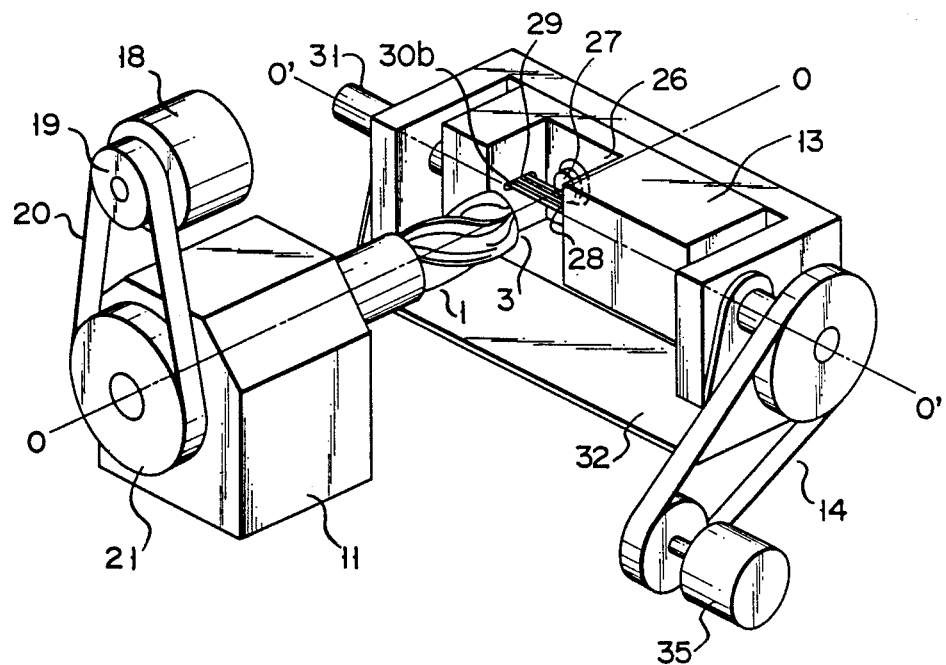
FIG. 2 is a perspective view, partly enlarged, showing the apparatus of FIG. 1.
Figure 3:
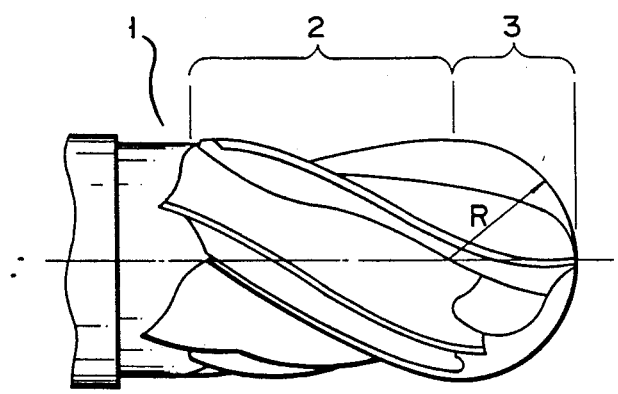
FIG. 3 is a side view showing an end of a tool in the apparatus shown in FIG. 1.
Figure 4:
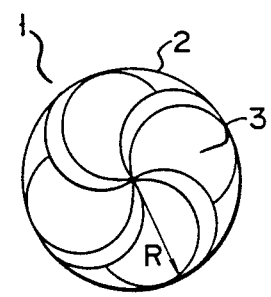
FIG. 4 is a front view showing the tool in the apparatus shown in FIG. 1.

Measuring head 13 is rotatably supported by frame 32, that is, by lateral shaft 31 extending in a direction perpendicular to the axis of tool 1. The center axis o'—o' (see FIG. 2) of lateral shaft 31 is located in the same level as one end 30b of measuring area 30. In this connection it is to be noted that one end 30b of measuring area 30 is substantially equal in height to the center axis o—o of tool 1.

Measuring head driving mechanism 14 includes motor 35 which permits measuring head 13 to be moved at a rate of a predetermined angle around lateral shaft 31 with said one end 30b of the measuring area as a center. A pulse motor is used as motor 35 to control the rotation position. Mechanism 14 includes a sensor, not shown, which is adapted to detect the position of head 13 and to feed its data back to control calculation unit 15.

A microcomputer, for instance, is employed as control calculation unit 15, including keyboard 37 for entering data and display unit 38, such as a CRT. Control calculation unit 15 can control aforementioned motors 18, 24 and 35 and is initially stored with a program for processing the data from sensors 26 and 27.

The method for measuring the shape, size etc., of tool 1 on the measuring apparatus will now be explained below.

First, tool 1 is manually clamped by the chuck of tool rotation unit 11. Then motor 24 is driven to cause unit 11 to advance toward measuring head 13. Unit 11 is stopped when end 30 of measuring area 30 is positioned about a few millimeters short of the forward end of tool 1.

Measuring head 13 is set at an angle of $\theta_1$ in FIG. 5 and, during one rotation of tool 1, light from light projecting unit 28 is received by light receiving unit 29. Stated in more detail, during one rotation of tool 1, the maximum value of the length $r_1$ of light shield portion 30a is selected for delivery to control calculation unit 15. Then line sensor 26 is set at an angle $\theta_2$ and again tool 1 makes one rotation during which time the length $r_2$ is evaluated. In this way, the line sensor is set at the angles $\theta_3$ and $\theta_4$ are evaluated.

Figure 9:
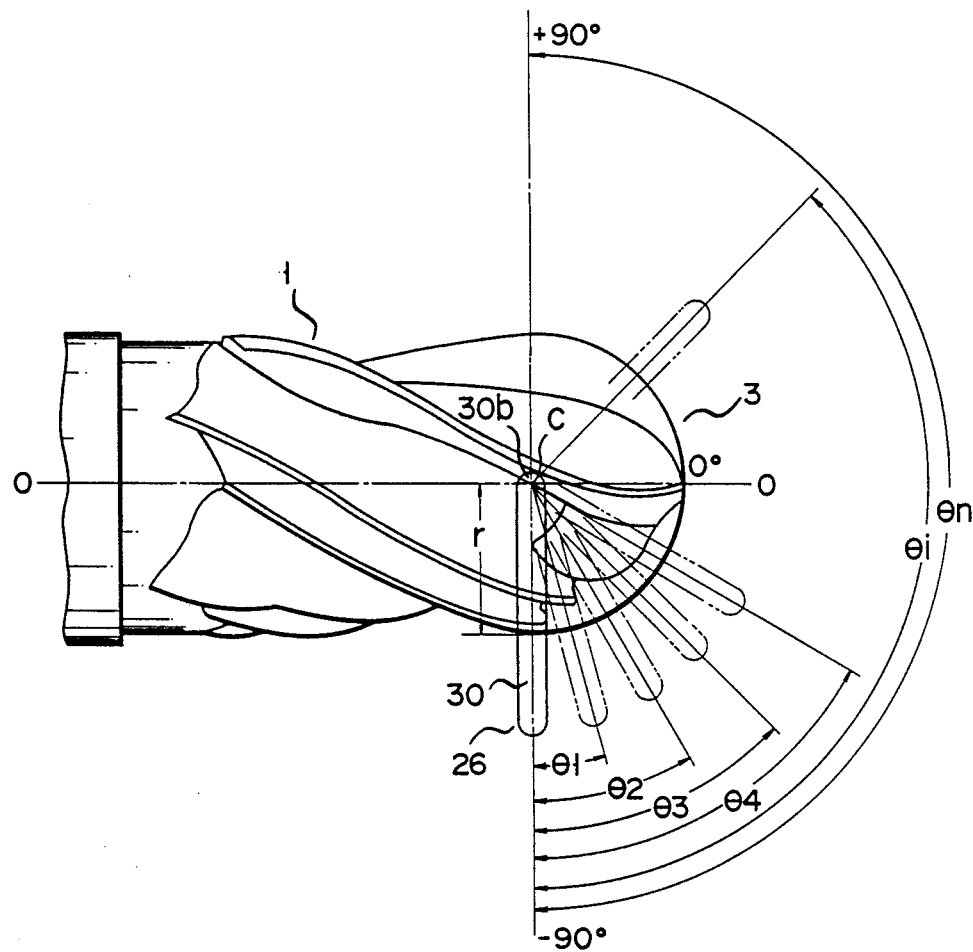
FIG. 9 is a side view showing the movement of the line sensor in the embodiment of FIG. 1 at the time of an actual measurement.

The lengths $r_1$ to $r_4$ and angles $\theta_1$ to $\theta_4$ are plotted by a computer as an (X, Y) coordinate (X1 to X4, y1 to y4) and the center position (X0, y0) of a circle passing the four positions r1, r2, r3 r4 is evaluated by the method for the least squares for the circle. The rotation center 30b of line sensor 26 is located in a position (x=o, y=o). As appreciated from FIG. 9, with tool 1 moved a distance Xo in the X direction, one end 30b of measuring area 30 can be located substantially in alignment with the center C of hemispherical section 3 of tool 1 as shown in FIG. 9. That is, centering is carried out (hereinafter referred to as a preparative measuring).

The aforementioned preparative measurement is effective to prevent an error of measurement which may be caused in the situations where measuring area 30 has a wide area. For example, the patterns of light shield portion 30a at the angles $\theta_1$ and $\theta_3$ in FIG. 5 are different from each other as shown in FIGS. 6 and 7.

In this way, the pattern of light shield portion 30a varies depending upon the angle through which measuring area 30 rotates, thus producing a cause for measurement errors. When the rotation center 30b of measuring area 30 is brought substantially in alignment with the center C of the forward end of tool 1, then the pattern of light shield portion 30a, though the angle $\theta$ varies, becomes substantially constant as shown in FIG. 8, assuring an exact measurement operation.

If measuring area 30 is adequately so narrow as to have a width W of several microns through tens of microns, there is no possibility of causing such errors of measurement. This can eliminate the necessity of performing the aforementioned preparative measurement. In this case, the real measurement as set forth below can be implemented with end 30b of measuring area 30 located a few millimeters (corres. to about one half the diameter of tool 1) from inside the forward end of tool 1, so that the shape, size, etc. of the tool can be measured accurately. According to measuring apparatus 10, an exact measurement can be made even in the situations where the axis o'—o' of the lateral shaft is somewhat vertically displaced relative to the axis o—o of tool 1 and one end 30b of the measuring area and center c of the tool end are somewhat shifted in the axial direction of tool 1.

The real measurement will now be explained below in connection with this invention.

As the time of conducting the real measurement, line sensor 26 is stopped in a position of $-90°$ as indicated by the solid line in FIG. 9. In this state, motor 18 is rotated, causing tool 1 to make one rotation around its axis. During the portion of one rotation of tool 1, data r is read by line sensor 26. Stated in more detail, the data r is read into the measuring apparatus at a rate of several tens through several hundreds of sites, for example, 200 sites, per rotation of tool 1 in which case maximum value data is fed to control calculation unit 15. Then line sensor 26 is moved through an angle of 15° with one end 30b of measuring area 30 as a center. That is, with line sensor 26 set at an angle of $\theta_1 = -75°$ the tool makes one rotation and the read-in of the data r is carried out.

Then measurement is repeated for every 15° angle, such as at an angle $\theta_2 = -60°$ C. and $\theta_3 = -45°$, until $\theta_n = +90°$ C. The aforementioned data fed to control calculation unit 15 is converted from the polar coordinate values ($r_o \sim r_n$, $\theta_o \sim O_n$) to the rectangular coordinate values ($X_o \sim X_n$, $y_o \sim y_n$). Then the radius R and center position (X, Y) are calculated by the least squares method and the variation of the radius values $r_o \sim r_n$ at the corresponding positions $\theta_n \sim \theta_n$ is given by:

$$Zi = R - \sqrt{(x_i - X)^2 + (y_i - Y)^2}$$

Figure 10:
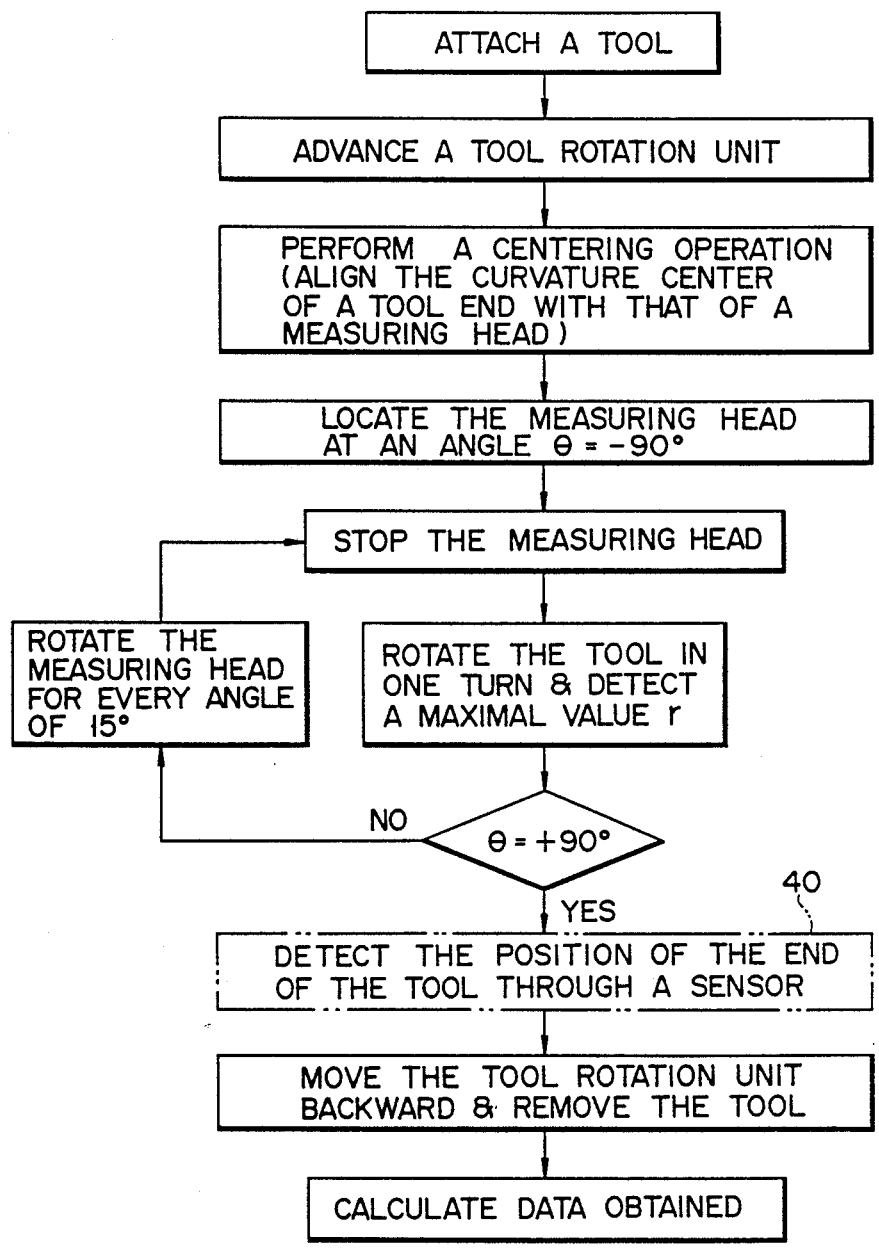
FIG. 10 is a flow chart showing the steps of a measuring method of this invention.

The various data thus obtained are displayed on display unit 38 and printed out, as required, on a recording paper. The aforementioned measuring steps are shown in FIG. 10. Process 40 in FIG. 10 may be omitted for tool 1 having a plurality of cutting edges, such as the aforementioned ball end mill. Process 40 will be set forth below.

In aforementioned measuring apparatus 10, the measurement of tool 1 is optically conducted by line sensor 26 in terms of its configuration, size, etc. without the need for placing the line sensor in contact with tool 1. Furthermore, measurement can be made in as small as a few minutes, irrespective of the extent of the operator's skill.

Figure 11:
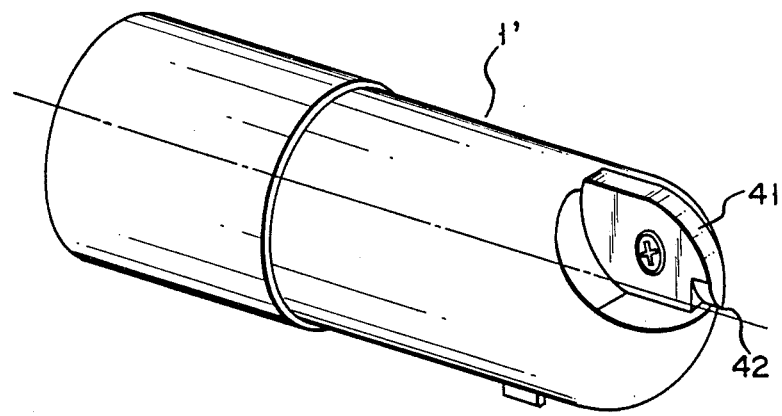
FIG. 11 is a perspective view showing a tool having a single cutting edge.

FIG. 11 shows tool 1' having single cutting edge 41 and step 42 on the end of cutting edge 41. Upon conducing a measuring operation on this type of tool 1', the following problem may be involved. That is, upon the rotation of tool 1', a variation in the measured value of light shield portion 30a occurs in the neighborhood of end 42 and thus a tendency may be produced for reading data t to become smaller than an actually measured value. In the measurement of this type of tool 1', it is preferable to employ a combination of line sensor 26 and touch sensor 27, that is, process 40 in FIG. 10 can be carried out in such a combined fashion.

Process 40 is carried out after the measurement of the radius ($r_o \sim r_n$) has been ended by virtue of line sensor 26. In this process, line sensor 26 is stopped in a position $\theta = 0°$ as shown in FIG. 12. Then motor 24 is driven, causing tool rotation unit 11 to advance into contact with touch sensor 27 where unit 11 is stopped. An amount of movement, S, of tool 1' can be calculated based on the number of driving pulses which are supplied to motor 24.

The distance L from one end 30b of measuring area 30 to touch sensor 27 is predetermined and hence the distance t from one end 30b of measuring area 30 to end 42 of the tool can be evaluated if the distance S in FIG. 12 is found on the measuring apparatus. The data t thus evaluated is conveyed, as a radius value r at $\theta = 0°$, to control calculation unit 15. By so doing, the radius value r at $\theta = 0°$ can be input to control calculation unit 15 so that the size of tool 1' can be accurately calculated.

Figure 13:
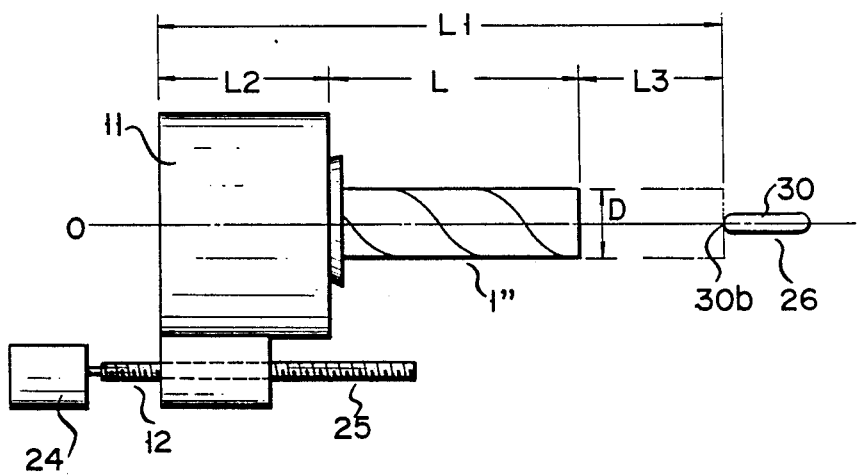
FIG. 13 is a side view showing another form of a tool with a portion of the apparatus of FIG. 1.
Figure 14:
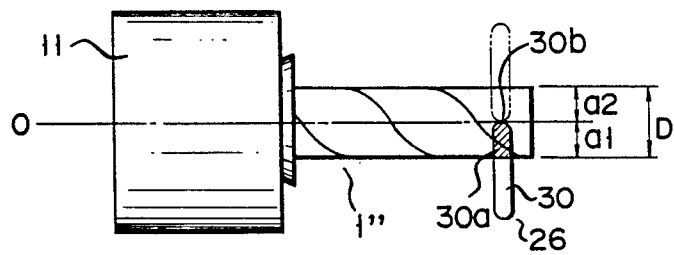
FIG. 14 is a side view showing the position of the line sensor when the diameter of the tool of FIG. 13 is to be measured.

The tool 1" as shown in FIGS. 13 and 14 can be measured on measuring apparatus 10 in terms of its length L and diameter D. As shown in FIG. 13, with measuring area 30 set in the horizontal direction, motor 24 is moved to cause tool 1" to advance until the end face of tool 1" reaches one end 30b of measuring area 30. At this time, the number of driving pulses which are delivered to motor 24 is counted on the measuring apparatus to evaluate the distance $L_3$. In this connection it is to be noted that the distances $L_1$ and $L_2$ are initially evaluated accurately. The length L of the tool 1" is given by $$L_1 - (L_2 + L_3)$$

As indicated by the solid line in FIG. 14, upon the measurement of the diameter D of tool 1", measuring area 30 is located in the direction perpendicular to tool 1" with one end 30b of measuring area 30 situated about 5 to 10 mm from inside the forward end of tool 1". While tool 1" makes one rotation, the length $a_1$ of light shield portion 30a is entered on the measuring apparatus and made doubled to obtain a diameter D of tool 1". In order to obtain the measuring accuracy, measuring area 30 may be 180° rotated, as indicated by a dot-dash line in FIG. 14, with one end 30b as a center to evaluate second measuring value $a_2$, followed by the evaluation of the diameter D of tool 1" through ($a_1 + a_2$).

What is claimed is:

1. An apparatus for measuring the shape and size of a rotary tool, comprising:

a tool rotation unit including means for chucking the tool and adapted to rotate the tool around a tool shaft;

tool moving means for reciprocably moving the tool rotation unit in an axial direction of the tool;

a measuring head adapted to be rotated around a lateral shaft located in a direction perpendicular to the axis of the tool and including a line sensor having line projecting and receiving units located opposite to each other in the direction perpendicular to the axis of the tool;

measuring head driving means for rotating the measuring head, at a rate of a predetermined angle, around the lateral shaft with one end of a measuring area as a center to allow the measurement to be made through the line sensor; and control calculation means capable of controlling the tool rotation unit, tool moving means and measuring head driving means and adapted to enter measured values output from the line sensor and to evaluate the measured values in accordance with a programmed processing procedure.

2. The apparatus according to claim 1, wherein said measuring head includes a touch sensor for delivering a signal at the instant said touch sensor touches the end of the tool.

3. The apparatus according to claim 1, wherein actuators are employed one for said tool rotation unit, said tool moving means and said measuring head driving means and each having a pulse motor.

4. A method for measuring the shape or size of a rotary tool with the use of a computer and a measuring head including a line sensor having light projecting and receiving units, comprising the steps of:

moving the tool in its axial direction so that one end of a measuring area of said line sensor is located in a position a given distance from inside the end of the tool;

moving the line sensor at a rate of a predetermined angle around a lateral shaft, located in a direction perpendicular to the axis of the tool, with said one end of said measuring area as a center;

rotating the tool around its axis for every said predetermined angle;

making a measurement through the line sensor each time the tool is set at said predetermined angle and entering measured data into the computer; and calculating the size of the tool on the basis of measured values and feeding them to a computer.

5. The method according to claim 4, wherein said measuring step is comprised of:

a preparative measuring step comprised of moving the tool in its axial direction so that said one end of said measuring area of said line sensor is located in a position a given distance inside said end of said tool; moving said line sensor at a rate of said predetermined angle around said lateral shaft, located in said direction perpendicular to said axis of said tool, with said one end of said measuring area as a center; rotating the tool around its axis for every said predetermined angle; making the measurement operation through the line sensor each time said tool is set at the respective predetermined angle; evaluating a center of said one end of said tool on the basis of the measured values; and moving said tool so that said one end of said measuring area is located at that center, and a real measuring step comprised of moving said line sensor, for every said predetermined angle, around said lateral shaft with said one end of said measuring area as a center; rotating said tool around its axis for the respective predetermined angle; making the measurement through said line sensor each time said tool is set at said respective angle; and calculating the size of said tool on the basis of said measured value.

6. The method according to claim 4, further comprising arranging, in addition to said line sensor, a touch sensor at said measuring head; moving said tool until said one end of said tool touches said touch sensor; evaluating a length from said one end of said measuring area to said end of said tool on the basis of an amount of movement attained at the preceding step; and entering said length, as measured value at an angle $\theta=0°$, into a computer.

* * * * *